United States Patent
Ecker et al.

(10) Patent No.: US 10,584,730 B2
(45) Date of Patent: Mar. 10, 2020

(54) CONNECTION ELEMENT, PROFILE SYSTEM AND METHOD FOR PRODUCING SAID TYPE OF PROFILE SYSTEM

(71) Applicant: Adient Luxembourg Holding S.à.r.l., Luxembourg (LU)

(72) Inventors: Roman Ecker, Trippstadt (DE); Christian Motsch, Kaiserslautern (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 414 days.

(21) Appl. No.: 15/327,805

(22) PCT Filed: Jul. 22, 2015

(86) PCT No.: PCT/EP2015/066768
§ 371 (c)(1),
(2) Date: Jan. 20, 2017

(87) PCT Pub. No.: WO2016/012503
PCT Pub. Date: Jan. 28, 2016

(65) Prior Publication Data
US 2017/0204889 A1    Jul. 20, 2017

(30) Foreign Application Priority Data

Jul. 23, 2014 (DE) .................. 10 2014 214 415
Oct. 29, 2014 (DE) .................. 10 2014 222 107

(51) Int. Cl.
*F16B 7/04* (2006.01)
*B60N 2/68* (2006.01)
*F16B 7/00* (2006.01)

(52) U.S. Cl.
CPC ............. *F16B 7/048* (2013.01); *B60N 2/68* (2013.01); *B60N 2/682* (2013.01); *F16B 7/00* (2013.01)

(58) Field of Classification Search
CPC ........ F16B 7/044; F16B 7/048; F16B 7/0486; Y10T 403/3906; Y10T 403/46; Y10T 403/4602; Y10T 403/7158; Y10T 403/73; B60Y 2410/123; B60Y 2410/124; B60Y 2410/125; B60N 2/68; B60N 2/682
USPC ....... 403/188, 230, 231, 394, 403; 52/287.1, 52/241, 587
See application file for complete search history.

(56) References Cited

U.S. PATENT DOCUMENTS

| | | | | |
|---|---|---|---|---|
| 3,914,062 A | * | 10/1975 | Heininger | B23K 33/00 403/231 |
| 4,135,756 A | * | 1/1979 | Hausmann | B62D 33/0617 296/190.03 |
| 5,226,696 A | * | 7/1993 | Klages | B62D 23/005 296/203.01 |

(Continued)

FOREIGN PATENT DOCUMENTS

| CN | 11 17 274 A | 2/1996 |
|---|---|---|
| CN | 103 620 073 A | 3/2014 |

(Continued)

*Primary Examiner* — Michael P Ferguson
(74) *Attorney, Agent, or Firm* — Marshall & Melhorn, LLC

(57) ABSTRACT

A connection element (1) connects profile parts (2, 3). The connection element includes at least one first connection area (11) for connecting to a first profile part (2), at least one second connection area (12) for connecting to a second profile part (3) and an embossing (4) for removing liquid varnish.

17 Claims, 1 Drawing Sheet

(56) References Cited

U.S. PATENT DOCUMENTS

| | | | | |
|---|---|---|---|---|
| 6,099,039 | A * | 8/2000 | Hine | B60G 11/181 180/311 |
| 6,138,425 | A * | 10/2000 | Wendt | E04B 9/00 403/205 |
| 6,213,679 | B1 | 4/2001 | Frobosilo et al. | |
| 6,293,604 | B1 * | 9/2001 | Williams | B60K 37/00 296/65.16 |
| 6,830,287 | B1 * | 12/2004 | Aghssa | B62D 25/087 280/784 |
| 6,948,768 | B2 * | 9/2005 | Corcoran | B21D 26/033 296/190.08 |
| 7,441,996 | B2 * | 10/2008 | Odulio | B62D 24/02 411/111 |
| 7,766,576 | B2 * | 8/2010 | Connell | A01B 51/00 403/400 |
| 8,403,585 | B2 * | 3/2013 | Falconer | E06B 3/9641 403/205 |
| 8,740,292 | B2 * | 6/2014 | Kishi | B62D 25/06 296/203.01 |
| 8,973,332 | B2 * | 3/2015 | Lee | E04B 1/24 403/205 |
| 9,045,895 | B1 * | 6/2015 | Lin | F16B 15/0053 |
| 9,061,709 | B2 * | 6/2015 | Ramoutar | B62D 27/023 |
| 2007/0130728 | A1 * | 6/2007 | Duerr | B60J 5/0468 16/382 |
| 2010/0011697 | A1 | 1/2010 | Nguyen et al. | |
| 2010/0187800 | A1 * | 7/2010 | Chen | B62D 23/005 280/785 |
| 2012/0247059 | A1 | 10/2012 | Daudet et al. | |
| 2014/0042773 | A1 * | 2/2014 | Grevener | B62D 29/043 296/181.1 |

FOREIGN PATENT DOCUMENTS

| | | |
|---|---|---|
| DE | 10 2011 000 450 A1 | 8/2012 |
| DE | 20 2013 001 904 U1 | 6/2014 |

* cited by examiner

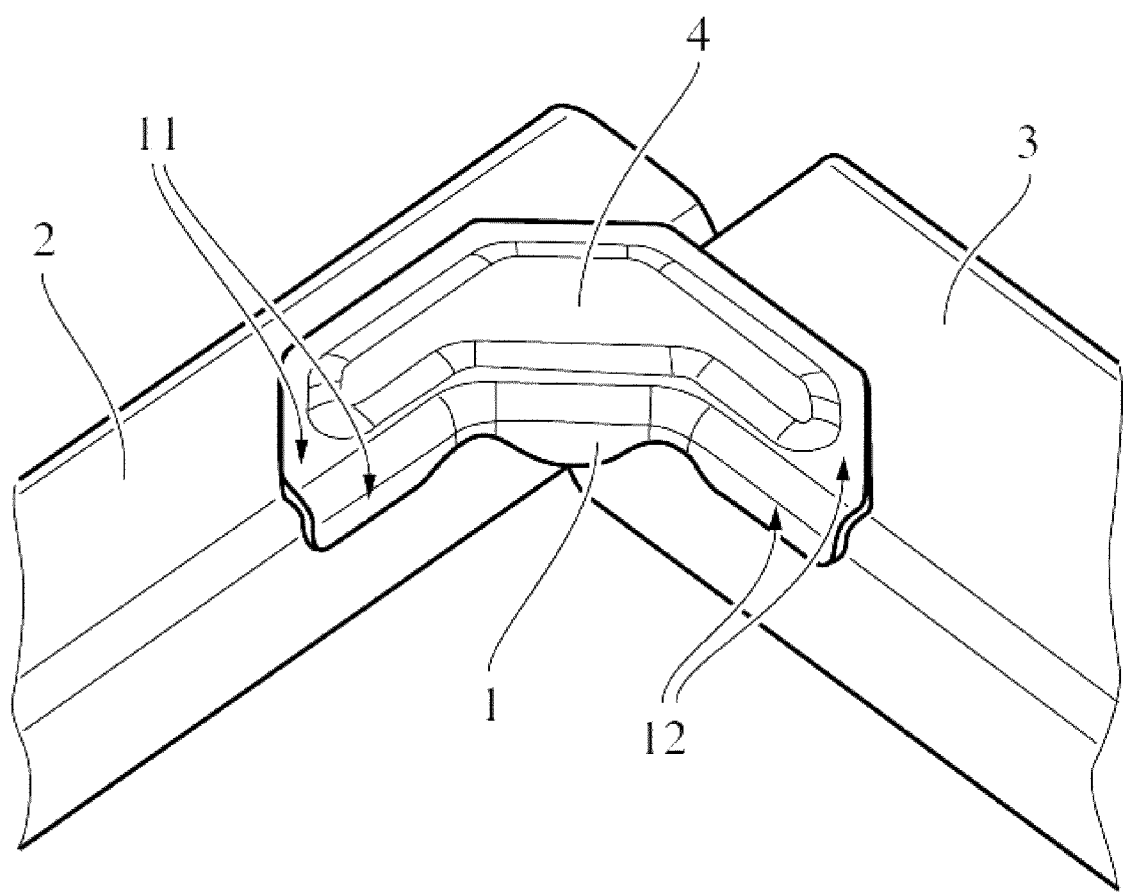

CONNECTION ELEMENT, PROFILE SYSTEM AND METHOD FOR PRODUCING SAID TYPE OF PROFILE SYSTEM

CROSS REFERENCE TO RELATED APPLICATIONS

This application is a United States National Phase Application of International Application PCT/EP2015/066768 filed Jul. 22, 2015, and claims the benefit of priority under 35 U.S.C. § 119 of German Applications 10 2014 214 415.9 filed Jul. 23, 2014 and 10 2014 222 107.2 filed Oct. 29, 2014, the entire contents of which are incorporated herein by reference.

FIELD OF THE INVENTION

The present invention relates to a connection element for connecting profile parts, wherein the connection element has at least one first connection region for connecting to a first profile part and at least one second connection region for connecting to a second profile part. Furthermore, the present invention relates to a profile system and to a method for producing a profile system.

BACKGROUND OF THE INVENTION

Connection elements of this type are already known from the prior art. For example, backrest frames are composed of a plurality of profile parts in vehicle manufacturing. In order to connect the individual profile parts, a connection element is arranged between or on the profile parts and the profile parts are fixedly connected in corresponding connection regions via the connection element. The profile system produced in such a manner is frequently coated in order, for example, to adapt the color of the profile system to its surroundings.

The problem arises here that, because of the extensive connection regions between the profile parts themselves and/or between the profile parts and the connection element, the coating cannot flow off, for example, between the profile parts, and therefore frequently coating accumulations form which, after the curing, cause noises, what is referred to as creaking of the coating, when the profile system is subjected to a load.

SUMMARY OF THE INVENTION

It was therefore an object of the present invention to provide a connection element, a profile system and a method for producing a profile system, in which no creaking, in particular no creaking of the coating, occurs.

This object is achieved by a connection element for connecting profile parts, wherein the connection element has at least one first connection region for connecting to a first profile part and at least one second connection region for connecting to a second profile part, wherein the connection element has a means for conducting away liquid coating, wherein the means for conducting away a flowable coating is an embossed portion which spaces the connection element from the respective profile part.

The statements made in relation to this subject matter of the present invention apply equally to the other subject matter of the present invention and vice versa.

The present invention relates to a connection element for connecting profile parts, wherein the connection element has at least one first connection region for connecting to a first profile part and at least one second connection region for connecting to a second profile part.

The first and the second profile part can be manufactured from any material familiar to a person skilled in the art. In particular, however, the first and/or the second profile part is manufactured from a metal, for example steel, and/or a plastic, for example polycarbonate (PC). The two profile parts are preferably manufactured from the same material and particularly preferably have the same wall thickness and/or substantially the same shape. Particularly preferably, the first and/or second profile part is composed of a lightweight construction material, for example a fiber reinforced plastic and/or aluminum. The first profile part and the second profile part are preferably backrest profile parts, in particular for a vehicle seat.

The first and/or second profile part is preferably extruded or pressed or produced by a flat sheet being bent to form a closed profile and the ends preferably being connected to one another, in particular by welding or adhesive bonding. The first and/or second profile part is particularly preferably a hollow profile. Very particularly preferably, the first and/or second profile part is extended in a substantially elongate manner, in particular linearly. Even more preferably, the first and/or second profile part has, transversely with respect to a main direction of extent, an angular or at least partially round or rounded, in particular a rectangular, square and/or circular, cross section. The first and/or the second profile part is preferably a closed profile part.

According to the invention, the connection element now has a means for conducting away a flowable liquid coating. By this means, it is advantageously possible for the coating to be able to drain away prior to complete curing and therefore for coating accumulations, which cause creaking of the coating, on and/or between the profile parts and/or between the profile parts and the connection element to be avoided.

A liquid coating is intended to be understood here as meaning in particular a coating which is at least still partially flowable, i.e. is not yet completely cured.

According to the invention, the means for conducting away a flowable medium is an embossed portion, in particular a stamped portion, which at least partially spaces the connection element from the profile part in the mounted state. A person skilled in the art understands that an embossed portion is in particular an integrally provided recess or bulge in the connection element and that a stamped portion is in particular a step-shaped, preferably flat, recess or bulge. During the embossing, an originally flat semi-finished product is placed into a three-dimensional mold. The material thickness of the semi-finished product is reduced locally during the embossing. By this means, it is made possible in a particularly advantageous manner that the connection element no longer lies over a large area against the profile parts, and the coating can therefore run off during the coating operation and/or directly subsequently between the profile parts and/or the profile parts and the connection element, i.e. in particular from the transition region, as a result of which an undesirable production of noise consequently does not occur. Furthermore, connection elements which are already present can advantageously be converted in a simple manner into connection elements according to the invention by the introduction of an embossed portion. Finally, the connection element according to the invention solves the present problem in a particularly cost-effective manner, in particular without additional components and/or additional time-consuming steps since the introduction of the embossed portion can preferably be integrated into the production process of the connection element.

According to a preferred embodiment, the connection element is a corner connector. Particularly preferably, the connection element is arranged in an end piece region of the first and/or second profile part. Very particularly preferably, the connection element is arranged between the first profile part and the second profile part in such a manner that said profile parts enclose an angle of 90°.

According to a preferred embodiment, the means, particularly preferably the embossed portion, is provided in a central region of the connection element. A person skilled in the art understands that, in this case, the first and/or second connection region corresponds in particular to an edge region of the connection element. By this means, an encircling first and/or second connection region is advantageously made possible, as a result of which a permanent stable connection to the first and/or second profile part is possible. Very particularly preferably, the means is provided only in the central region.

According to a preferred embodiment, the first connection region and/or the second connection region has a width of 5 mm to 10 mm, particularly preferably a width of 7 mm to 8 mm. Very particularly preferably, the width of the first connection region and of the second connection region is provided substantially uniformly. By this means, a first and/or second connection region is advantageously provided via which a secure and fixed connection of the connection element to the profile parts is possible. A person skilled in the art understands in this connection that the width of the connection region preferably corresponds to an extent parallel to a main plane of extent of the connection element and in particular in a substantially radial direction from a center point of the connection element.

According to a preferred embodiment, the means, particularly preferably the embossed portion, is substantially arranged in a transition region between the first profile part and the second profile part. This advantageously permits the coating to flow off between the profile parts. Very particularly preferably, the means is provided in such a manner that a cavity is provided between the connection element and the first and/or second profile part, at least in the transition region.

According to a preferred embodiment, the first profile part and the second profile part are arranged adjacent to each other, in particular in such a manner that the first profile part and the second profile part are in contact in a contact region. Particularly preferably, the contact region is provided flat and/or integrally. A person skilled in the art understands that the contact region is dependent on the geometry and the arrangement of the profile parts.

According to a preferred embodiment, the first connection region and/or the second connection region has a smaller extent in the transition region than in a region of the connection element that is remote from the transition region. By this means, it is possible in a particularly advantageous manner to provide as much space as possible in the transition region for the means, and therefore any penetrating coating can flow away as well as possible while a stable and fixed connection between the connection element and the profile parts is possible in the remaining regions.

According to a preferred embodiment, the embossed portion is provided in such a manner that the connection element is spaced in the region of the embossed portion from the first profile element and/or the second profile element, in particular in the mounted state. It is intended to be understood by this in particular that a cavity is produced in the region of the embossed portion between the connection element and the first and/or second profile element, into which cavity the coating can flow during the coating operation and/or from which cavity the coating can flow away again after the coating operation, in particular through a gap or an opening between the first and the second profile part.

According to a preferred embodiment, the depth of the embossed portion, in particular perpendicular to the main plane of extent of the embossed portion and/or of the connection element, is at least 0.3 mm, in particular at least 0.4 mm. A person skilled in the art understands that the depth is dependent here substantially on the deformability of the material from which the connection element is produced, and/or on the space requirements in the mounted state. The embossed portion is at least intended to be of a depth such that a capillary action does not occur.

According to a preferred embodiment, the embossed portion has at least one recess. Particularly preferably, a size of the recess parallel to the main plane of extent of the embossed portion is significantly smaller than a size of the embossed portion in the main plane of extent. Very particularly preferably, the embossed portion has at least one recess in the region of the first profile part and/or at least one recess in the region of the second profile part. Even more preferably, the embossed portion has at least two recesses which are arranged at in each case opposite ends of the embossed portion. By this means, reliable flowing in and/or out of the coating is made possible in a particularly advantageous manner.

According to a preferred embodiment, the connection element is of substantially triangular design.

The connection element is preferably of substantially flat design.

According to a preferred embodiment, the connection element is configured with a full surface. This is intended to be understood in particular as meaning that the connection element does not have any recesses, such as, for example, bores. By this means, a material weakening of the connection element is advantageously avoided. Alternatively thereto, the connection element and/or the means has at least one recess. Particularly preferably, the recess is arranged in the transition region. By this means, it is advantageously made possible for coating which has entered the transition region to be able to flow away through the at least one recess.

According to a further preferred embodiment, the connection element has an at least partially bent over edge. By this means, a particularly stable connection between the connection element and the first profile part and/or between the connection element and the second profile part is advantageously made possible.

According to a preferred embodiment, the means for conducting away a flowable medium is at least one channel. Particularly preferably, at least one end of the channel is provided in the transition region. Very particularly preferably, a further end of the channel is provided on the edge of the connection element. The channel is provided in particular in such a manner that the flowable medium, in particular the coating, can flow away out of the transition region outward, i.e. into the free space on the other side of the connection element and of the profile parts. A person skilled in the art understands in this connection that a channel is in particular a substantially tubular, i.e. elongate, passage. The channel can have any desired cross section here, for example a round, square or polygonal cross section. The channel can have a rectilinear or curved profile. The channel preferably has a substantially semicircular cross section. The embossed portion is preferably designed as a channel.

According to a preferred embodiment, the connection element is produced from the same material as the first profile part and/or the second profile part. Particularly preferably, the connection element is produced from a metal and/or a plastic, for example from steel and/or PC. Very particularly preferably, the connection element is produced from a lightweight construction material, in particular from aluminum and/or a fiber reinforced plastic. Suitable fiber reinforced plastics are in particular glass fiber reinforced plastic (GFRP) and/or carbon fiber reinforced plastic (CFRP).

A further subject matter of the present invention is a profile system comprising a connection element, in particular according to the invention, and at least one first profile part and one second profile part, wherein the connection element is connected in a first connection region to the first profile part and in a second connection region to the second profile part.

The statements made in relation to this subject of the present invention apply equally to the other subject matter of the present invention and vice versa.

The profile system according to the invention makes it possible, after a coating operation, to effectively avoid, in a particularly advantageous manner, possibly occurring annoying noises, such as, for example, creaking of the coating.

Yet another subject of the present invention is a method for producing a profile system, in particular according to the invention, wherein at least one first profile part is connected in a first connection region of a connection element, in particular according to the invention, to the connection element, and wherein at least one second profile part is connected in a second connection region of the connection element to the connection element, and wherein the profile system is coated after installation by means of cathodic dip coating (CTC).

According to a preferred embodiment, the connection is undertaken in a form-fitting, force-fitting and/or integrally bonded manner, in particular by means of welding and/or adhesive bonding. Particularly preferably, the connection is undertaken by laser welding and/or metal active gas welding (MAG welding). Very particularly preferably, the connection is undertaken in a spot wise manner and/or linearly, in particular in the shape of a wavy line.

According to a preferred embodiment, the first profile part is arranged in a form- and/or force-fitting manner on the second profile part prior to the connection, in particular the first profile part is arranged with one end at least partially on an outer surface of the second profile part. By this means, a particularly stable connection is advantageously provided between the first profile part and the second profile part.

The present invention is described in detail below with reference to the attached FIGURES. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an embodiment of the profile system according to the invention in a perspective view.

DESCRIPTION OF THE PREFERRED EMBODIMENTS

Referring to the drawings, FIG. 1 illustrates an embodiment of the profile system according to the invention in a perspective view. The profile system comprises a first profile part 2 and a second profile part 3, which are connected to each other here in a respective end region by a connection element 1 according to the invention. The first profile part 2 and the second profile part 3 are manufactured, for example, from aluminum, steel and/or glass fiber reinforced plastic.

The connection element 1 here has a flowable medium conducting means for conducting away a flowable medium. According to the embodiment illustrated, the flowable medium conducting means is an embossed portion 4, here a stamped portion, i.e. an in particular plateau-shaped bulge. A first connection region 11 and a second connection region 12, which are provided integrally and merging into each other here are arranged around the embossed portion 4. The first profile part 2 is connected to the connection element 1 in the first connection region 11 and the second profile part 3 is connected to same in the second connection region 12.

The connection is undertaken, for example, by welding, in particular laser welding and/or MAG welding. In order to obtain as stable a connection as possible, the connection element 1 is preferably manufactured from the same material as the first profile part 2 and the second profile part 3.

The profile parts 2, 3 are arranged here relative to each other in such a manner that they enclose an angle of approximately 90°.

If the profile system is coated, the coating can flow away between the first and the second profile part 2, 3 on account of the embossed portion 4, and therefore no coating accumulations which may as a result lead to an undesirable production of noise, the creaking of the coating, are therefore formed.

While specific embodiments of the invention have been shown and described in detail to illustrate the application of the principles of the invention, it will be understood that the invention may be embodied otherwise without departing from such principles.

The invention claimed is:

1. A method for producing a profile system, the method comprising:
   providing a profile system comprising at least one first profile part, at least one second profile part and a connection element comprising at least one first connection region for connecting to the at least one first profile part, at least one second connection region for connecting to the at least one second profile part and a flowable medium conducting means for conducting away a liquid coating, the flowable medium conducting means for conducting away a liquid coating comprising an embossed portion which spaces the connection element from each respective profile part;
   connecting the at least one first profile part, in the at least one first connection region of the connection element, to the connection element;
   connecting the at least one second profile part, in the at least one second connection region of the connection element to the connection element; and
   coating the profile system after installation by means of cathodic dip coating;

whereby the first profile part and the second profile part are arranged adjacent to each other such that a cavity between the connection element and the first profile part, formed by the embossed portion in a region thereof facing the first profile part, and a cavity between the connection element and the second profile part, formed by the embossed portion in a region thereof facing the second profile part, are both arranged adjacent to a transition region between the first profile part and the second profile part; and conducting away a flowable portion of the liquid coating via the cavity between the embossed portion and the first profile part and via the cavity between the embossed portion and the second profile part and subsequently via a gap or an opening between the first and second profile part and/or via a gap or an opening between the connection element and the first and second profile part.

2. The method as claimed in claim 1, wherein the connection element is a corner connector.

3. The method as claimed in claim 1, wherein the flowable medium conducting means is provided in a central region of the connection element.

4. The method as claimed in claim 1, wherein the flowable medium conducting means is arranged in a transition region between the at least one first profile part and the at least one second profile part, wherein the flowable medium conducting means is provided such that said cavity is provided between the connection element and the at least one first profile part and/or the at least one second profile part, at least in the transition region.

5. The method as claimed in claim 1, wherein the flowable medium conducting means for conducting away a flowable medium is at least one channel.

6. The method as claimed in claim 5, wherein:
the embossed portion has a main plane of extent; and
a depth of the embossed portion, perpendicular to the main plane of extent of the embossed portion element, is at least 0.3 mm.

7. The method as claimed in claim 5, wherein:
the connection element has a main plane of extent;
a depth of the at least one channel, perpendicular to the main plane of extent of the connection element, is at least 0.3 mm.

8. The method as claimed in claim 1, wherein the at least one first profile part and the at least one second profile part are arranged adjacent to each other such that the at least one first profile part and the at least one second profile part are in contact in a contact region.

9. A method for producing a profile system, the method comprising:
providing a profile system comprising a first profile part, a second profile part and a connection element comprising at least one first connection region for connecting to the first profile part, at least one second connection region for connecting to the second profile part and a flowable medium conducting means for conducting away a liquid coating, the flowable medium conducting means comprising an embossed portion;
connecting the first profile part to the connection element in the first connection region of the connection element, with the embossed portion spacing the connection element from the at least one first profile part to form a cavity between the connection element and the first profile part in a region of the embossed portion facing the first profile part;
connecting the second profile part to the connection element in the second connection region of the connection element, with the embossed portion spacing the connection element from the second profile part to form a cavity between the connection element and the second profile part in a region of the embossed portion facing the second profile part;
applying a coating to the profile system after the step of connecting the first profile part to the connection element and after the step of connecting the second profile part to the connection element by cathodic dip coating; and
conducting away a flowable portion of the coating via the cavity between the embossed portion and the first profile part and via the cavity between the embossed portion and the second profile part;
whereby the first profile part and the second profile part are arranged adjacent to each other such that the cavity between the connection element and the first profile part and the cavity between the connection element and the second profile part are both arranged adjacent to a transition region between the first profile part and the second profile part; and
conducting away a flowable portion of the liquid coating via the cavity between the embossed portion and the first profile part and via the cavity between the embossed portion and the second profile part and subsequently via a gap or an opening-between the first and second profile part and/or via a gap or an opening between the connection element and the first and second profile part.

10. The method as claimed in claim 9, wherein the connection element is a corner connector.

11. The method as claimed in claim 9, wherein the flowable medium conducting means is provided in a central region of the connection element.

12. The method as claimed in claim 9, wherein the flowable medium conducting means is arranged in a transition region between the first profile part and the second profile part.

13. The method as claimed in claim 9, wherein the flowable medium conducting means for conducting away a flowable medium is at least one channel.

14. The method as claimed in claim 13, wherein:
the at least one channel has a main plane of extent; and
a depth of the channel, perpendicular to the main plane of extent of the channel, is at least 0.3 mm.

15. The method as claimed in claim 13, wherein:
the connection element has a main plane of extent;
a depth of the channel, perpendicular to the main plane of extent of the connection element, is at least 0.3 mm.

16. The method as claimed in claim 9, wherein the first profile part and the second profile part are arranged adjacent to each other such that the first profile part and the second profile part are in contact in a contact region.

17. A method for producing a profile system, the method comprising:
providing a profile system comprising a first profile part, a second profile part and a connection element comprising a first connection region for connecting to the first profile part, at least one second connection region for connecting to the second profile part and a flowable medium conducting means for conducting away a liquid coating, the flowable medium conducting means comprising an embossed portion;
connecting the first profile part to the connection element in the first connection region of the connection element, with the embossed portion spacing the connection element from the first profile part to form a cavity between the connection element and the first profile part in a region of the embossed portion facing the first profile part;

connecting the second profile part to the connection element in the second connection region of the connection element, with the embossed portion spacing the connection element from the second profile part to form a cavity between the connection element and the second profile part in a region of the embossed portion facing the second profile part, whereby the first profile part and the second profile part are arranged adjacent to each other such that the first profile part and the second profile part are in contact in a contact region and the cavity between the connection element and the first profile part and the cavity between the connection element and the second profile part are both arranged adjacent to a transition region between the first profile part and the second profile part;

applying a coating to the profile system after the step of connecting the first profile part to the connection element and after the step of connecting the second profile part to the connection element by cathodic dip coating; and conducting away a flowable portion of the coating via the cavity between the embossed portion and the first profile part and via the cavity between the embossed portion and the second profile part and subsequently via a gap or an opening at or adjacent to the transition region between the first profile part and the second profile part.

\* \* \* \* \*